United States Patent [19]

Redenbaugh

[11] Patent Number: 4,580,985

[45] Date of Patent: Apr. 8, 1986

[54] SIMULATOR DEVICE FOR DEMONSTRATING THE BENEFITS OF WEARING A SEAT BELT

[76] Inventor: Dave Redenbaugh, 1131 Lakeridge, Danville, Ill. 61832

[21] Appl. No.: 703,392

[22] Filed: Feb. 20, 1985

[51] Int. Cl.$^4$ ............................................. G09B 25/00
[52] U.S. Cl. ..................................... 434/365; 434/62
[58] Field of Search ................. 434/62, 275, 302, 305, 434/365, 366; 446/429, 430

[56] References Cited

U.S. PATENT DOCUMENTS

| | | | |
|---|---|---|---|
| 2,433,540 | 12/1947 | Wright | 434/365 X |
| 3,266,175 | 6/1966 | Palumbi | 434/302 |
| 3,520,981 | 7/1970 | Chambers | 434/302 |
| 3,740,871 | 6/1973 | Berton et al. | |
| 3,753,301 | 8/1973 | Daniel et al. | |
| 3,877,156 | 4/1975 | Itoh | |
| 3,890,723 | 6/1975 | Haurat et al. | |
| 4,095,352 | 6/1978 | Kale | 434/275 |

OTHER PUBLICATIONS

Stuart L. Wright et al., "Safety Belt Convincer" Journal of Traffic Safety Education, California State Automobile Association, Jan. 1974 Issue.

Primary Examiner—Harland S. Skogquist
Attorney, Agent, or Firm—Woodard, Weikart, Emhardt & Naughton

[57] ABSTRACT

A simulator device for demonstrating the advantages of wearing a vehicle safety harness comprises a track and a seat connected to and moveable along the track. A dummy object comprising an egg is used to simulate a person seated in a vehicle. A safety harness is mounted to the seat and, in a first mode of operation of the device, harnesses the dummy object in the seat. A means is provided for propelling the seat forwardly along the track while a stop means limits the forward movement of the seat along the track. An impact shield is mounted at one end of the track for impacting the egg thereagainst in a second mode of operation. In the first mode of operation, the egg is harnessed on the seat to simulate the restraining effect of a safety harness on a person harnessed in a seat during a vehicle crash. In the second mode of operation, the egg is left unharnessed in the seat to simulate the impact effect on an unharnessed person involved in a vehicle crash.

4 Claims, 6 Drawing Figures

SIMULATOR DEVICE FOR DEMONSTRATING THE BENEFITS OF WEARING A SEAT BELT

BACKGROUND OF THE INVENTION

The present invention relates to the field of educational demonstration devices and, more particularly, to such devices which are useful to demonstrate the advantages of wearing a vehicle safety harness or belt.

Various devices have been in use to simulate the effects of a vehicle crash upon occupants. Thus for example, the following patents disclose dummies and devices therefore which are useful in simulating the effects upon occupants involved in a vehicular crash:

| U.S. Pat. No. | Inventor | Issued |
| --- | --- | --- |
| 3,740,871 | Berton et al. | June 26, 1973 |
| 3,753,301 | Daniel et al. | Aug. 21, 1973 |
| 3,877,156 | Itoh | Apr. 15, 1975 |
| 3,890,723 | Haurat et al. | June 24, 1975 |

Each of the above simulator devices is used to perform crash tests for vehicle design purposes. Such crash simulators and dummies are, however, rather large, complex and expensive. None of these devices is particularly suited for use in a classroom demonstration situation where it is desirable to simply and inexpensively demonstrate, in a highly graphical manner, the effects of sudden rapid deceleration upon vehicle occupants.

SUMMARY OF THE INVENTION

A simulator device for demonstrating the advantages of wearing a vehicle safety harness in accordance with the present invention comprises a track and a seat connected to and moveable along the track. A dummy object suitable for simulating a person in a vehicle safety demonstration is also provided, the dummy object being an egg. There is further provided a safety harness mounted to the seat and arranged and disposed for harnessing the dummy object in the seat. Additionally, there is provided a means for propelling the seat forwardly along the track and a stop means for limiting the forward movement of the seat along the track. The simulator device is further characterized by having an impact shield mounted at one end of the track for impacting the dummy object thereagainst. The simulator device is operable in a first mode wherein the egg is harnessed in the seat to simulate the restraining effect of a safety harness on a person harnessed in a seat during a vehicle crash and a second mode wherein the egg is unharnessed on the seat to simulate the impact effect on an unharnessed person involved in a vehicle crash.

Accordingly, it is an object of the present invention to provide an improved simulator device for demonstrating the advantages of wearing a vehicle safety harness.

It is a further object of the present invention to provide a vehicle crash simulator device which is inexpensive and simple to use and capable of repeated use, particularly for classroom demonstration purposes.

Related objects and advantages of the present invention will become more apparent by reference to the following figures and detailed description.

DESCRIPTION OF THE PREFERRED EMBODIMENT

Figure 1:
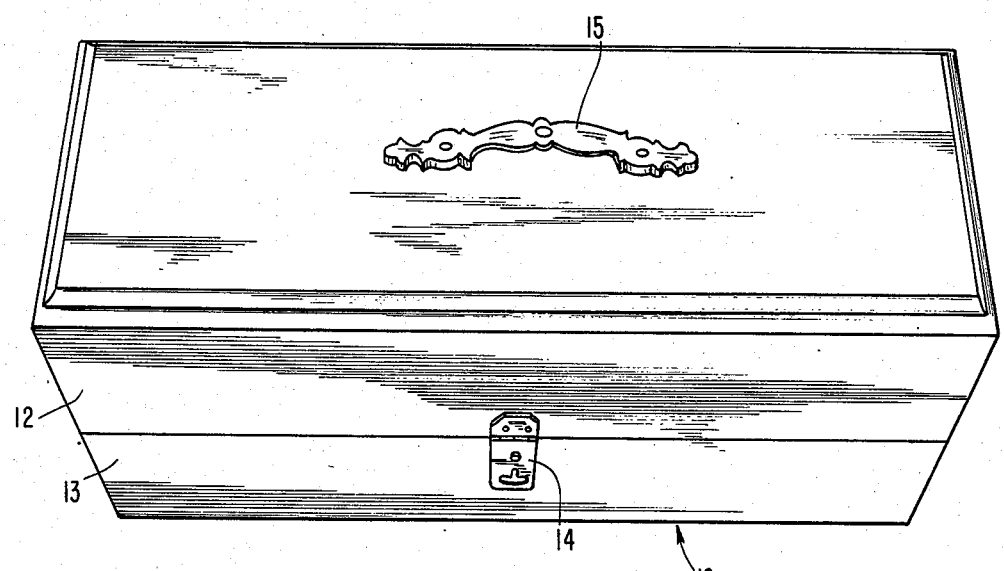
FIG. 1 is a perspective view showing the simulator device of the present invention in its closed position comprising its own carrying case.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the simulator device of the present invention is shown generally designated at 10. The simulator comprises a wooden box having upper and lower compartments 12 and 13 hinged together at the rear and opened and closed by means of a latch 14. A handle 15 is mounted on the upper compartment 12 for carrying purposes.

Figure 2:
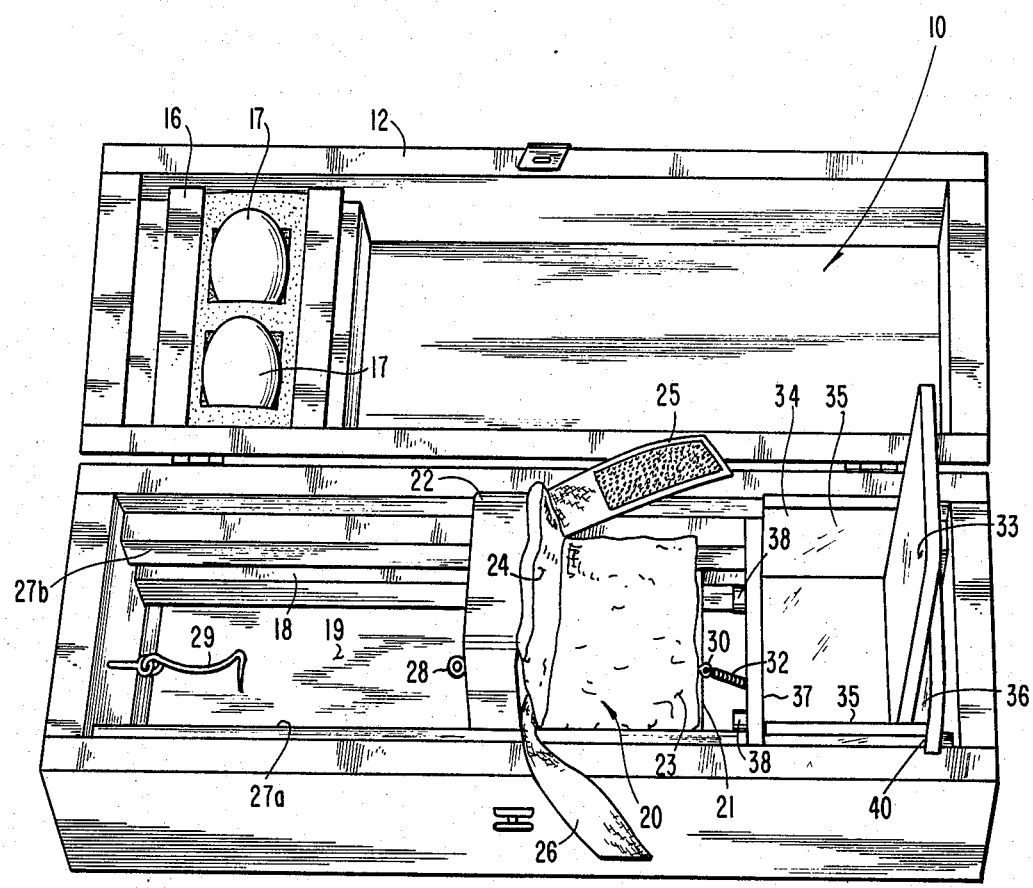
FIG. 2 is a perspective view showing the carrying case open and displaying the simulator device.

Referring to FIG. 2, inside the upper compartment 12, at one end thereof, is a cupped section 16 adapted to receive therein two eggs 17 in storage for later use as dummy objects. Inside the lower compartment 13, extending along both the front and rear sides 27a and 27b is a lengthwise running groove or slot 18. The slotted sides and bottom 19 of compartment 13 together form a track in which is slidably received a seat 20.

Seat 20 has a wooden bottom portion 21 slidably received within the slots 18 so as to allow the seat to be guided within slots 18 as it moves along the length of the track. In addition to wooden bottom portion 21, seat 20 is provided with an upright wooden back portion 22. On the wooden seat portions 21 and 22 are cushions 23 and 24, respectively. Velcro ® straps 25 and 26 are securely attached to back of seat 20 on each side thereof and are adapted to wrap around and secure an egg placed on seat 20.

At the rear of back portion 22 is mounted an eyelet screw 28 which is sized to receive a hook 29 mounted inside one end of compartment 13. At the front of bottom portion 21 is mounted another eyelet screw 30 to which is attached one end of a helical spring 32. The other end of spring 32 is fixedly attached inside the compartment 13 at the end opposite hook 29. Also located at the other end of compartment 13 is an upright clear plastic shield 33 mounted inside a box shaped plastic tray 34. The tray has side and rear walls 35 and 36, respectively, which extend above the corresponding sides of compartment 13, and a front wall 37 of relatively shorter height. a pair of bumpers 38 extend from tray 34 in the direction of seat 20. Tray 34 is slidably received within a pair of aligned vertical slots 40 which permit easy removal of tray 34 and shield 33 from compartment 13.

Figure 3:
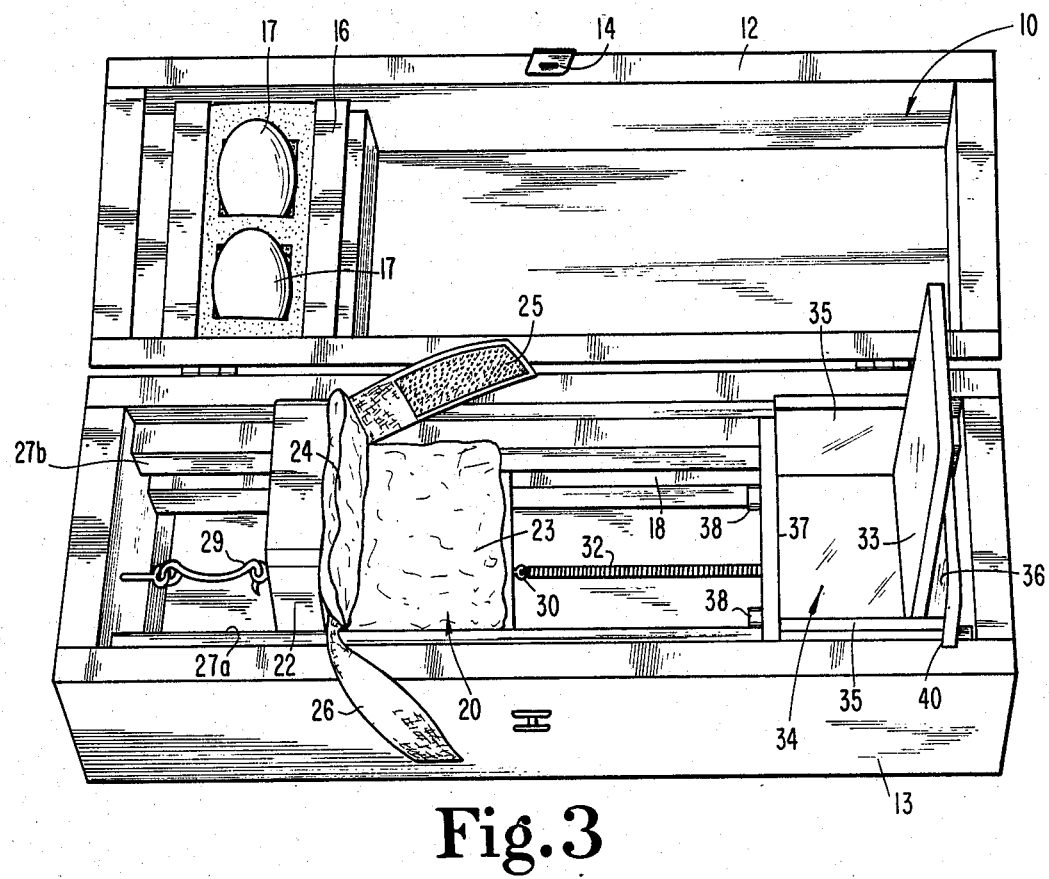
FIGS. 3-5 are perspective views showing the operation of the simulator device in demonstrating the benefits of wearing a vehicle safety harness.
Figure 4:
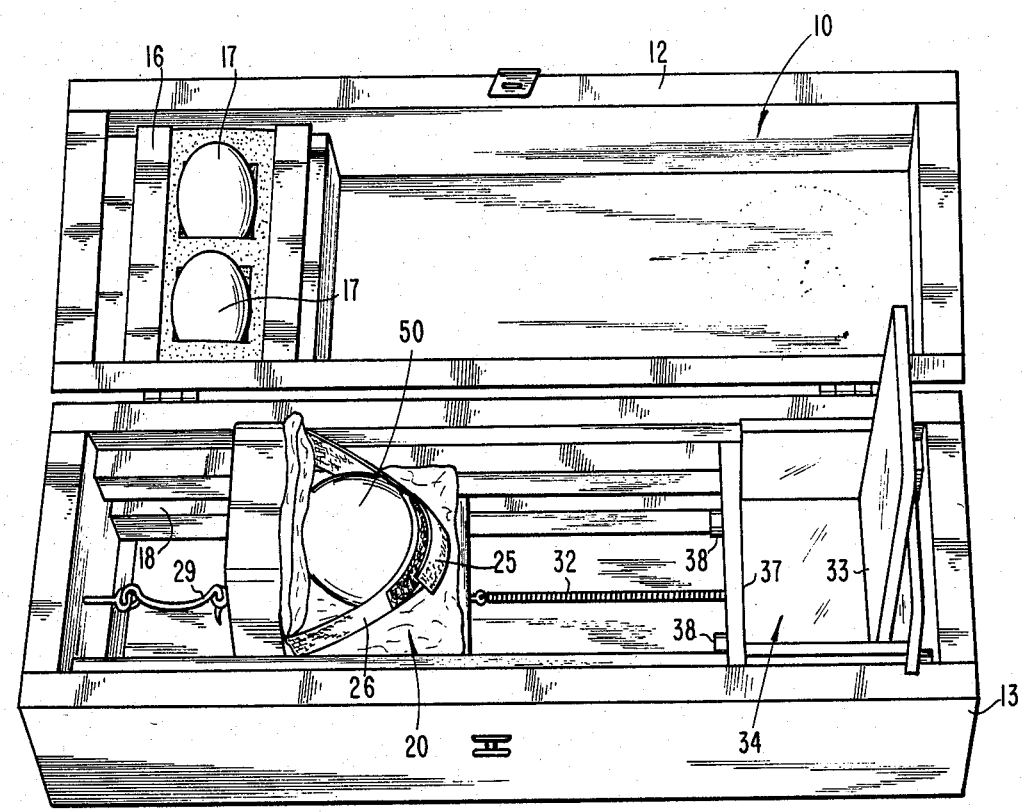
Figure 5:
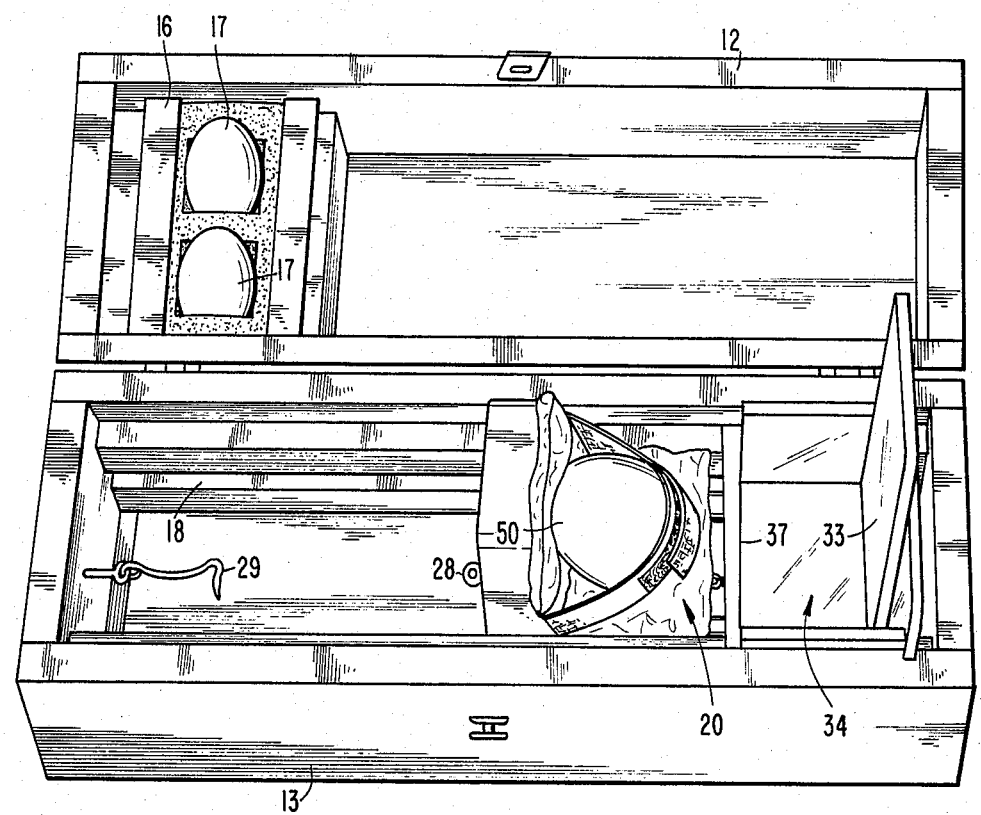

Referring to FIGS. 3–5, the operation of the device 10 may be described as follows. In order to demonstrate the benefits of using a vehicle safety restraint, the seat 20 is pulled rearwardly against the tension of spring 32 and latched in the rearward position with hook 29 (FIG. 3). With seat 20 securely latched in the rearward position, an egg 50 is placed in the seat 20 and straps 25 and 26 connected together as shown in FIG. 4. With the egg 50 secured in the "ready" position, the hook 29 is unlatched, causing the seat 20 to be propelled rapidly forward along the track under the force of spring 32. As the seat 20 reaches the forward end of the track, it contacts the bumpers 38 on tray 34 and the seat is brought to an abrupt halt (FIG. 5). If the egg has been properly strapped in position on seat 20 it will not be damaged by the impact of seat 20 against bumpers 38.

Figure 6:
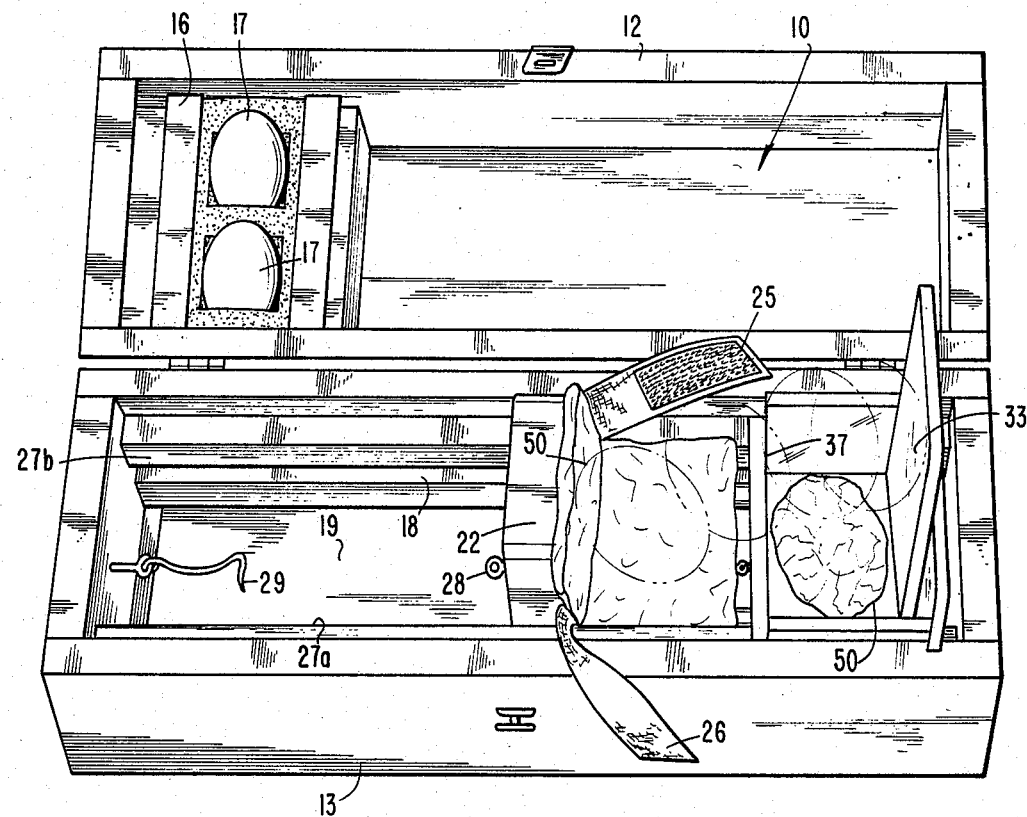
FIG. 6 is a perspective view showing the operation of the simulator device in demonstrating the disadvantages of not wearing a vehicle safety harness.

In order to demonstrate the disadvantages of not wearing a safety restraint device, the demonstration is performed in the same manner as described, except that the straps 25 and 26 are not secured around the egg. As shown in FIG. 6, the result is that when the seat 20 is brought to an abrupt halt, the egg 50 will be hurled forwardly, clearing the front wall 37 of tray 34 and striking against the shield 33 with sufficient force to break the egg. Tray 34 serves to catch the broken egg and prevent spillage of its contents into the lower compartment 13. Tray 34 is then removed from compartment 13 and the broken egg disposed of to prepare for the next demonstration.

It is to be appreciated that the simulator device 10 is simply and inexpensively constructed. Further, the device employs a relatively inexpensive and readily obtained dummy object, that being an egg, which very graphically demonstrates the benefits of vehicular safety restraints.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A simulator device for demonstrating the advantages of wearing a vehicle safety harness, comprising:
   a track;
   a seat connected to and moveable along said track;
   a dummy object suitable for simulating a person in a vehicle safety demonstration, said dummy object being an egg;
   a safety harness mounted to said seat and arranged and disposed for harnessing said dummy object in said seat;
   a means for propelling said seat forwardly along said track;
   a stop means for limiting the forward movement of said seat along said track;
   an impact shield mounted at one end of said track for impacting said dummy object thereagainst, said simulator device operable in a first mode wherein said egg is harnessed on said seat to simulate the restraining effect of a safety harness on a person harnessed in a seat during a vehicle crash and a second mode wherein said egg is unharnessed in said seat to simulate the impact effect on an unharnessed person involved in a vehicle crash.

2. A simulator device adapted for use with a dummy object to demonstrate the advantages of wearing a vehicle safety harness, comprising:
   a track;
   a seat connected to and moveable along said track, said seat sized to accommodate a dummy object suitable for simulating a person in a vehicle safety demonstration thereon, said dummy object being an egg;
   a safety harness mounted to said seat and arranged and disposed for harnessing said dummy object in said seat;
   a means for propelling said seat and dummy object forwardly along said track;
   a stop means for limiting the forward movement of said seat along said track;
   an impact shield mounted at one end of said track for impacting said dummy object thereagainst, said simulator device operable in a first mode wherein said egg is harnessed on said seat and restrained from impacting said shield to simulate the restraining effect of a safety harness on a person harnessed in a seat during a vehicle crash and a second mode wherein said egg is unharnessed in said seat and impacts said shield to simulate the impact effect on an unharnessed person involved in a vehicle crash.

3. The simulator device of claim 1 wherein said simulator includes a box enclosure having an upper compartment including a receptacle for storing one or more eggs for use in said demonstration, said box enclosure further having a lower compartment hinge mounted to said upper compartment and including said track.

4. The simulator device of claim 1 wherein said propelling means includes a spring having one end attached to said seat and another end attached to said lower compartment, said spring having a biased position in which said seat is urged forwardly along said track towards said shield.

* * * * *